Oct. 27, 1964 W. C. LOVELL ETAL 3,154,418
PACKAGING AND STIRRING IMPLEMENT FOR MAKING BEVERAGES
Filed Dec. 1, 1961 2 Sheets-Sheet 1
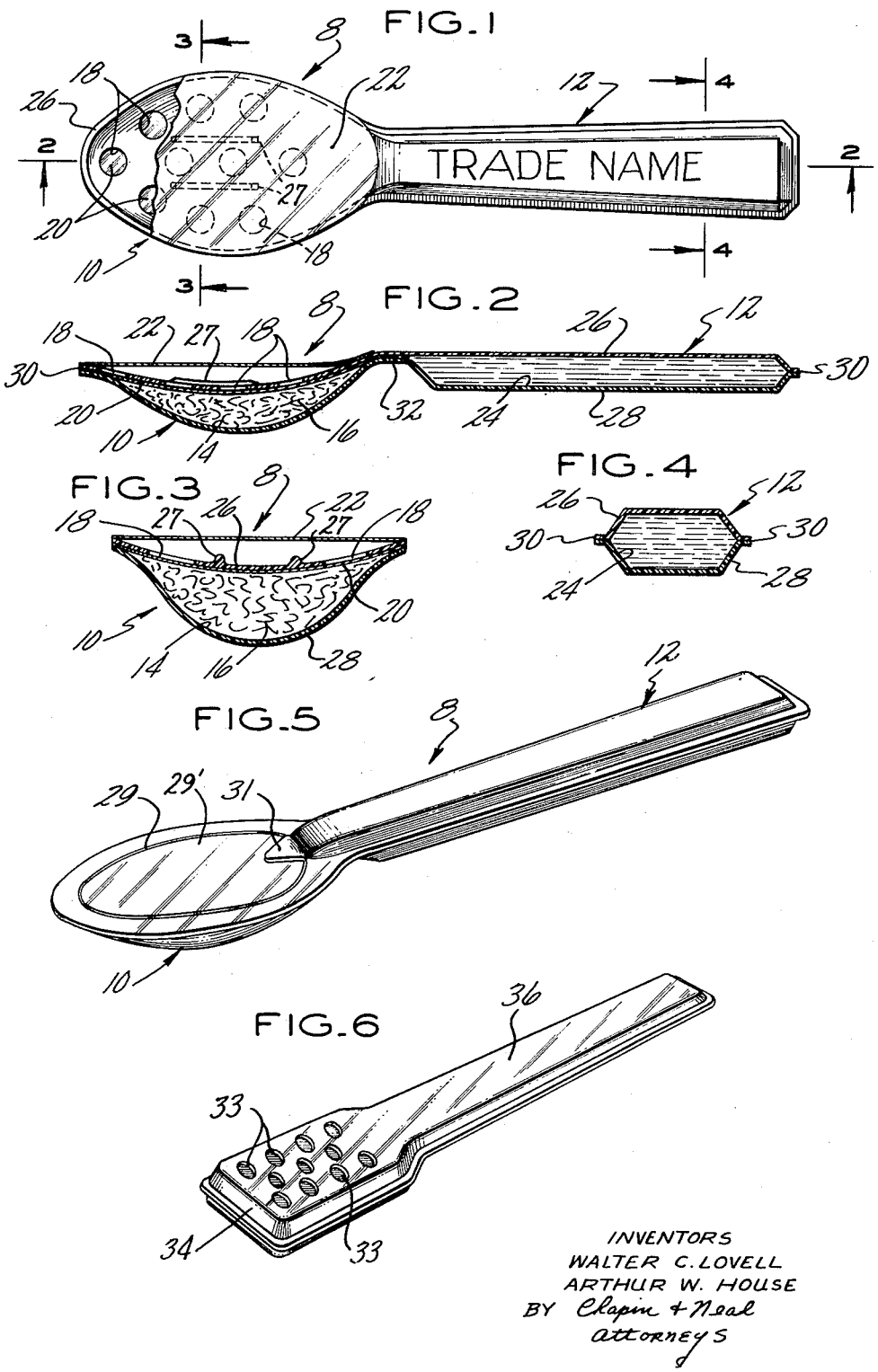
INVENTORS
WALTER C. LOVELL
ARTHUR W. HOUSE
BY Chapin + Neal
Attorneys

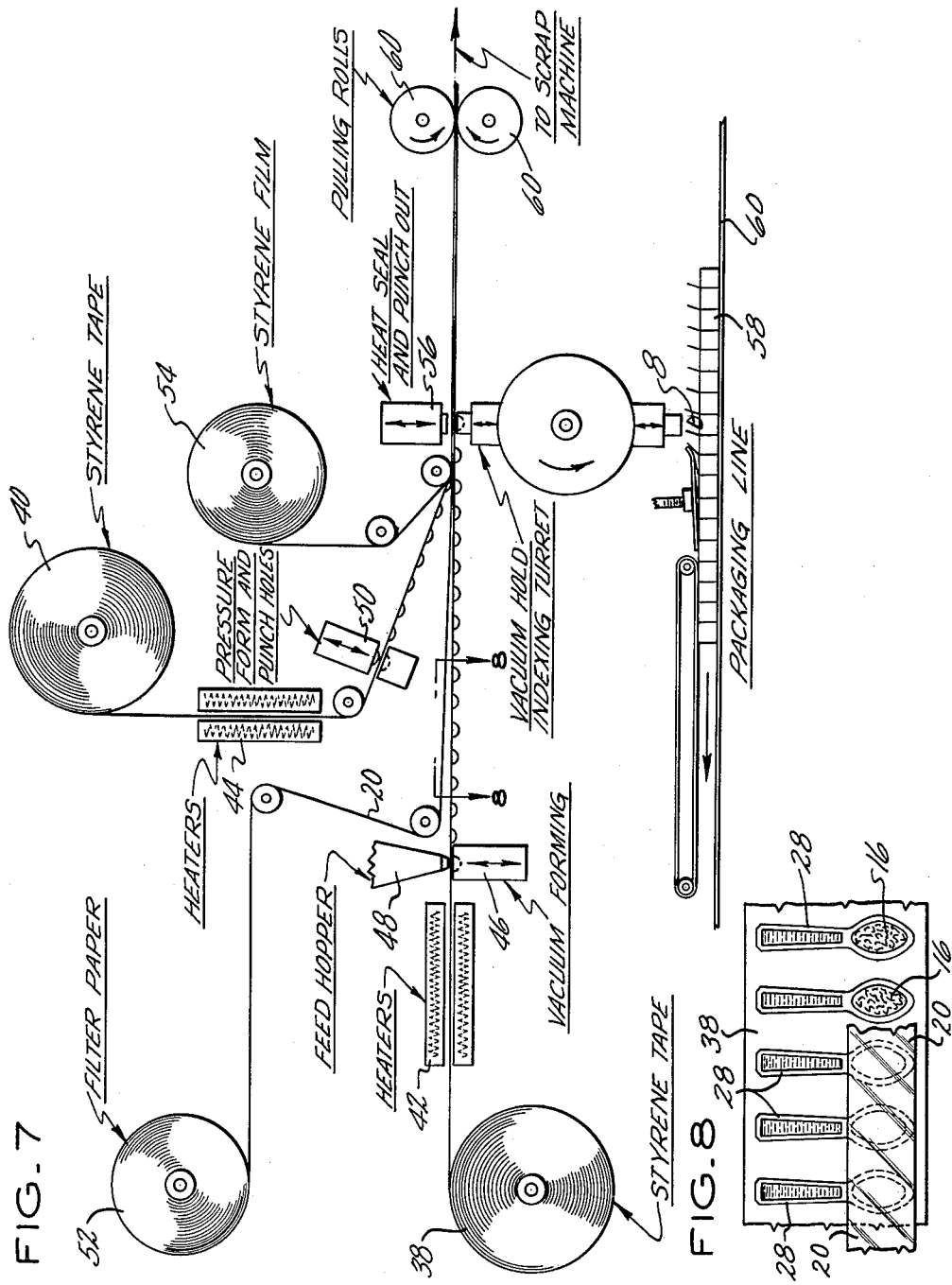

3,154,418
PACKAGING AND STIRRING IMPLEMENT FOR MAKING BEVERAGES

Walter C. Lovell, Hazardville, and Arthur W. House, Shaker Pines Lake, Conn., assignors, by mesne assignments, to De Bell & Richardson, Inc., Hazardville, Conn., a corporation of Connecticut
Filed Dec. 1, 1961, Ser. No. 156,252
3 Claims. (Cl. 99—77.1)

This invention relates to devices used for preparing various types of beverages such as tea, coffee, and the like, and particularly to dispensers which serve as containers for the beverage-making ingredient.

While the convenience of tea bags is widely acknowledged, their principal disadvantage is the unwieldly character they assume when soggy and limp after steeping in hot water. To transfer the moisture-laden bag from the cup to the saucer, has always required a high degree of care and dexterity.

While there have been a number of attempts to provide more convenient beverage dispensers, they have not been successful, either because they were unsatisfactory in operation or the cost differential was so large as to make them unattractive competitively with conventional dispensers such as the tea bag.

The principal object of this invention is to provide improved means for preparing various types of beverages by infusion or dissolution in liquid such as water, milk or the like. The object is achieved by providing an implement which is rigid from end-to-end, even after it has been immersed in boiling water. In this way, the implement can be readily manipulated in the manner of an ordinary spoon for removal from the cup. In addition, the implement may be used to stir the beverage being prepared to insure complete infusion or dissolution of the beverage-making ingredient.

Another object of this invention is to provide an efficient and economical method of manufacturing devices of the above type whereby the devices are competitive in price with similar items now presently available on the market.

The above and other objects and advantages of this invention will be apparent from the following description and with reference to the accompanying drawing in which:

FIG. 1 is a top plan view of one type of implement embodying this invention; with parts broken away to reveal its construction;

FIG. 2 is a sectional view taken along line 2—2 of FIG. 1;

FIG. 3 is a sectional view taken along line 3—3 of FIG. 1;

FIG. 4 is a cross sectional view taken along line 4—4 of FIG. 1;

FIG. 5 is a modified form of the invention;

FIG. 6 is another modified form of the invention;

FIG. 7 is a diagrammatical showing of a method for making the devices embodying this invention; and FIG. 8 is a sectional view taken along line 8—8 of FIG. 7.

Shown at 8 in FIG. 1 is a dispenser implement embodying this invention. As shown, the implement is in the form of a spoon comprising a body or bowl portion 10 and a handle 12. The bowl portion of the spoon is hollow and provides a chamber 14 for a beverage-making ingredient, as shown at 16, which may be tea, coffee, cocoa or any water soluble flavoring or concentrate. The bowl portion of the spoon is provided with a plurality of orifices 18 which permit free flow of liquid into the chamber containing the beverage ingredient. Spanning the perforations within the bowl is a porous sheet material 20 which prevents escape of the ingredient, or its sediment, into the vessel in which the beverage is being prepared. The contents of the dispenser are protected against moisture, dirt and the like by means of a film of synthetic plastic 22 which is sealed entirely around the edges of the bowl 10. The film 22 may be any suitable thermoplastic material such as styrene and may be in the order of .001" in thickness. Intermediate its edges, the film 22 is spaced from the concave perforated surface of the bowl facilitating removal of the film when it is desired to use the dispenser.

Similar to the bowl, the handle 12 of the spoon is also of hollow construction. This provides a second chamber 24 which may be used for holding other beverage-making ingredients, such as lactic powder and sweetener. The hollow construction also serves to impart strength and rigidity to the handle even though the material is extremely thin.

As shown, the spoon is composed of upper and lower halves or shells 26 and 28 respectively. The shells are a thin, synthetic thermoplastic material having a thickness in the range of .005" to .008" which has been found suitable for the purpose of this invention. Each half of the spoon may be formed in any convenient manner to any suitable configuration which will provide the chambers 14 and 24. As shown, the bowl may be provided with stiffening ribs 27. The two halves 26 and 28 are joined together along their marginal edges as shown at 30. Inwardly of their edges, the two strips are in spaced opposed relation.

Preferably the bowl and handle chamber are separate. For this reason a partition 32 is provided by the engagement of wall portions of the upper and lower strips, serving to keep separate different ingredients in the two chambers.

In FIG. 5 is a modified form of dispenser embodying this invention. The dispenser is of similar construction to the spoon shown in FIGS. 1-4. However, this dispenser is intended to be used for beverage ingredients of a soluble material such as orange juice concentrate, instant tea and the like. The spoon is entirely sealed, the bowl being imperforate and provided with a score line 29. A tab 31 may be used to remove the central portion 29' of the bowl.

In FIG. 6 is shown a dispenser in the form of a stirring rod which possesses all the advantages of the spoon, shown in FIG. 1. However, the stirring rod is provided with perforations 33 opening into the chamber from both sides. This arrangement permits free flow of liquid through the body 34 of the stirring rod. The handle 36 of the rod may be filled with other suitable beverage-making ingredients, as desired.

Illustrated diagrammatically in FIG. 7 is a method and apparatus for making the dispensers, described above. As shown two rolls of synthetic plastic tape 38 and 40 are provided. The tape is preferably a high density polyethylene or polystyrene, having a range of thickness between .005" and .008". From the rolls, each of the tapes is led through a heating chamber such as 42 and 44. The synthetic plastic is softened in the heating chamber sufficiently to enable the tape to be pressure or vacuum formed. It has been found that with the tape moving at a rate of about 10 feet per minute, a temperature of approximately 250° F. is suitable for this purpose.

As illustrated the tape 38 is used to form the lower halves of the dispensers and the tape 40 forms the upper halves. After passing through the heating chamber, the tape 38 is led through a vacuum forming device 46. The plastic tape is drawn downwardly by the vacuum into a die whereby it forms the lower half of the spoon, including both the bowl and handle. Simultaneously with the vacuum forming, one or more beverage ingredients are introduced into the bowl and handle depressions of the strip. This may be done by a hopper and metering device as shown at 48.

At the same time the upper halves of the spoon are formed in the other strip 40 by means of a pressure forming device 50. During pressure forming the upper strip is provided with the holes of perforations 18. While both halves of the spoon could be formed either by vacuum or pressure forming, it has been preferable to vacuum form the lower half and pressure form the upper half. In this way, the lower half can be filled while it is being formed and the upper half can be perforated as it is being formed.

Porous paper, such as the filter paper 20, is used to prevent escape of the beverage ingredients from the bowl of the dispenser. As shown, the web of paper is drawn from a roll 52. The paper may be narrower than the plastic strips but as shown in FIG. 8 is of sufficient width to span the bowl portion of the spoon. Another roll 54 of plastic film, similar in size to the paper web, is provided for sealing the bowl of the dispenser as shown at 22 in FIGS. 1–3.

After the upper and lower halves of the spoon are formed, the two tapes are brought together so that the upper and lower spoon portions of each are registered in edge-to-edge relation. With the filter paper interposed between the bowl-forming portions of the plastic strips and the styrene film positioned over the concave surface of the bowl, the spoon halves are heat sealed together along their marginal edge portions and punched from the tapes. This may be done by a heat sealing and punch out device 56. The spoons drop into cartons 58 on conveyor 60 to a suitable packaging machine. The scrap tape is led from the machine by means of the rolls 60.

The completed spoon as shown in FIG. 1, is entirely hermetically sealed, the two halves of the spoon being sealed together and the plastic film 22 is sealed entirely around the edges of the bowl. Inwardly of the edges of the bowl, the film 22 spans the concavely curved portion of the bowl and can be readily punctured and removed when it is desired to use the spoon. Dispensers of this type provide a most convenient and sanitary way of dispensing various types of beverages and since they are hermetically sealed protect the beverage ingredient from dirt, dust and moisture.

The contents carried in the handle compartment of the dispenser can be used by squeezing the handle at its side edges. When this is done, the two strips bow outwardly and the seal at the end of the handle "pops open."

In summary, applicant's invention provides a sanitary, rigid stirrer-dispenser which will not soften or deteriorate in boiling water and is constructed to enable economical manufacture. Moreover, the dispenser provides a hermetically sealed package which can be sterilized if necessary or desirable.

What is claimed is:

1. Packaging and stirring implement comprising a pair of strips of synthetic plastic material, complementary in shape and joined together around their peripheral edges forming a handle and bowl of integral double wall construction throughout the length of said implement and forming within the implement a plurality of chambers, one of said chambers being in the bowl and containing a beverage making ingredient, said handle providing at least one other chamber containing another ingredient for use in making the beverage, the bowl of said implement having a plurality of orifices through at least one of said strips, and a porous sheet material spanning said orifices to prevent escape of its contents and attached to the peripheral edge portion of the bowl of said implement, the double wall construction providing a plurality of containers and imparting rigidity to said implement throughout its length.

2. Packaging and stirring implement as set forth in claim 1 and including a moisture impervious material hermetically sealing the bowl chamber.

3. Packaging and stirring implement as set forth in claim 2 in which said plastic strips are thermoplastic tape formed to provide upper and lower portions of the said stirring implement.

References Cited in the file of this patent
UNITED STATES PATENTS

| | | |
|---|---|---|
| Re. 21,338 | Haut | Jan. 30, 1940 |
| 1,456,010 | Richeimer | May 22, 1923 |
| 1,489,806 | Anderson | Apr. 8, 1924 |
| 1,601,613 | Fenyves | Sept. 28, 1926 |
| 1,708,456 | Tunick | Apr. 9, 1929 |
| 1,931,765 | Leever | Oct. 24, 1933 |
| 2,252,119 | Edmonds | Aug. 12, 1941 |
| 2,570,521 | Chester | Oct. 9, 1951 |
| 2,736,150 | Loew | Feb. 28, 1956 |
| 2,745,751 | Pichardo | May 15, 1956 |
| 2,859,515 | Kinman | Nov. 11, 1958 |
| 2,958,168 | Vogt | Nov. 1, 1960 |
| 3,000,157 | Ollier et al. | Sept. 19, 1961 |